Patented Apr. 25, 1944

2,347,187

UNITED STATES PATENT OFFICE 2,347,187

ENAMELING

Leon J. Frost, Niagara Falls, N. Y., assignor to The Titanium Alloy Manufacturing Company, New York, N. Y., a corporation of Maine No Drawing. Application February 7, 1942, Serial No. 429,953

7 Claims. (Cl. 106—48)

This invention relates to the art of vitreous enameling. More particularly, it relates to vitreous enamel compositions of good opacity, non-toxic and relatively resistant to fruit acids. The invention also relates to the method of preparing vitreous enamels therefrom. These enamels are particularly useful for the preparation of cooking ware, hospital utensils and the like.

In the application of vitreous enamels to iron or other metal bases, it is important from a commercial standpoint that the enamel composition be opaque and have good hiding power, that is it should hide the dark colored base to which it is applied. This is customarily accomplished by incorporating in the composition an opacifier or opaquing agent, among which may be mentioned compounds of tin, antimony and zirconium. Of these materials, compounds of tin are quite expensive. Compounds of antimony are not satisfactory for use in kitchen ware, hospital utensils and the like, because of their poisonous nature. Compounds of zirconium, on the other hand, are relatively inexpensive, produce high opacity, and are non-toxic. Because of their very refractory nature, however, certain other constituents must be incorporated in vitreous enamels containing zirconium compounds, in order that the ingredients may be properly smelted together to form a frit. Many of these ingredients, however, cause the enamel to be less resistant to fruit acids, which again is undesirable when the enamels are to be applied to cooking ware, hospital utensils and the like. This difficulty may be partially overcome by means of an enamel composition containing a certain amount of titanium dioxide. Such enamels, however, are usually deficient in color, gloss and general appearance. In addition a certain amount of antimony oxide is usually added, which is undesirable because of its toxicity.

Besides lack of toxicity and good opacity, enamels for cooking ware and the like must have other characteristics. Such enamels must be resistant to abrasion and wear. In addition, they must not fail or break down under the heat changes normally encountered in cooking, sterilization, etc.

It is therefore among the objects of this invention to provide an enameling composition and method of enameling in which the final enamel, as applied to an iron or other base, with or without the customary dark-colored ground coat, has good opacity, durability, resistance to wear, resistance to thermal change, resistance to fruit acids and is free from toxic ingredients. It is also among the objects of this invention to prepare enamels having a higher gloss, better color and appearance than previous enamels containing zirconium compounds with titanium compounds. Other objects will appear hereinafter.

These objects are accomplished by means of the frit compositions, opacifier compositions and methods more fully described hereinafter.

In preparing the present enamels, the raw ingredients are intimately mixed together in the manner customarily employed in the enamel industry. They are then fused together to a uniform glass and quenched in water in the usual way to form a frit. In this fusion or melting process, however, it is preferable that extreme temperatures should be avoided, especially at the end of the melt, and the draft of the smelting furnace should be so restricted as to avoid any unnecessary burning out or removal of any fluorine containing constituents. In this fusion process, a temperature range of from 2000 to 2150° F. is preferred.

The resulting glass or frit, which may be either clear or somewhat opaque, may then be milled with 40 to 48% of water together with suitable clays, opacifying materials, and slip controlling constituents. More water may be added as necessary to secure a suitable consistency. The fineness of milling may be such as to leave not over 5 grams of dry residue on a standard 200 mesh sieve from 100 cc. of liquid milled enamel slip. However, a fineness which leaves not over 1 gram dry residue on such a sieve is preferred, and for some purposes still finer milling may be desired. The enamel slip thus prepared is adjusted for use and applied to the ware by the usual methods of dipping or spraying, dried, and fired on at temperatures which preferably vary from 1480 to 1540° F.

The raw ingredients for use in the practice of the present invention should be so proportioned that the frit formed therefrom should have ingredients within the following limits (per cent by weight), calculated as oxides.

|  | Per cent |
|---|---|
| Silica ($SiO_2$) | 32 to 58 |
| Zirconium oxide ($ZrO_2$) | 6 to 16 |
| Titanium oxide ($TiO_2$) | 4 to 9 |
| Zinc oxide (ZnO) | 0 to 5 |
| Phosphorus pentoxide ($P_2O_5$) | 0 to 3½ |
| Alumina ($Al_2O_3$) | 0 to 3½ |
| Boric anhydride ($B_2O_3$) | 6 to 14 |
| Soda ($Na_2O$) | 13 to 20 |
| Fluorine ($F_2$) | 2½ to 11 |

The frit may also contain, in greater or lesser amounts, CaO, Li$_2$O, and others. Any or all of these ingredients may be supplied as compounds other than the oxides, and such in fact is usually the practice. Thus zirconium is customarily supplied as zircon or zirconium silicate, although it may be supplied as zirconium oxide or other zirconium compounds. Phosphorus may be supplied as bone ash, phosphate rock, sodium or calcium phosphates, apatite or others. Fluorine may be supplied as fluorspar, cryolite, or others. Other possibilities will appear in the accompanying examples.

Of the above ingredients, alumina is customarily employed to secure proper working properties of the enamels. However, it is important that it be kept as low as possible and still secure such working properties. With the larger amounts of alumina in enamels of the present type, the enamels tend to become discolored, while the gloss and acid resistance are impaired. A certain amount of alumina (as clay) is customarily incorporated in the slip, in order to secure these working properties but this does not have the same harmful effect as alumina in the frit. The frit is customarily smelted for such a length of time that the various ingredients apparently react with each other in some way to form compounds of various kinds. In the case of alumina, these compounds are undesirable for the reasons pointed out above.

Of the remaining ingredients, fluorine is preferably in excess of 5%. Zinc may be omitted entirely, higher reflectances but lower acid resistance being obtained as the amount of zinc increases. It is preferred that phosphorus (calculated as P$_2$O$_5$) be present at least to the extent of ½%. Too high a phosphorus content tends to decrease the flow of the enamel and result in difficulties in application. About 7 to 8% boric anhydride has been found most satisfactory. Calcium (calculated as the oxide, although it may be added as the fluoride) may be present up to 14% CaO. All of the ingredients, of course, although calculated as the oxides, may actually exist in the final frit as various reaction products between the various oxides, although the exact nature of the compounds formed is not at present fully understood.

When a frit prepared as previously outlined is milled with water to form a slip, customary enamel practice is to add a suitable amount of an opacifier at the mill. It is also known to incorporate all the opacifier in the original frit composition, but entirely different and generally inferior results are obtained with this method. The present invention, however, is concerned only with processes employing mill addition opacifiers. It has been found that the ordinary mill addition opacifiers, such as tin oxide, antimony oxide, and zirconium oxide, produce a certain degree of opacity when used with frits as described above. Nevertheless, this opacity is not as great as desired or as expected from results with other types of enamels. In addition, tin and antimony compounds are unsuitable for the reasons hereinbefore stated.

It has been found that greatly improved opacity can be obtained with frits of the present type, by employing as the mill addition opacifier a combination of titanium dioxide, zirconium oxide and a double silicate of zirconium and another metal of group II of the periodic system forming a white or colorless oxide, with or without other substances such as aluminum oxide. These ingredients are thoroughly mixed together, milled with water to a fineness of —325 mesh in a ball mill, dried, and the opacifier is then ready for use.

The preferred composition is one containing 40% titanium dioxide, 35% zirconium oxide and 25% zinc zirconium silicate. Other double zirconium silicates which may be used are magnesium zirconium silicate, calcium zirconium silicate and barium zirconium silicate. The complex double zirconium silicate being the reaction product of zircon with alumina and zinc oxide, as described in U. S. Patent 2,083,024, may also be used. Suitable proportions are 20 to 60% TiO$_2$, 15 to 55% ZrO$_2$ and 10 to 40% double zirconium silicate.

In addition to opacifier, clay and water are also added at the mill in ordinary enameling practice. In order to secure the preferred shade of white in the enamel, it is necessary to use a clay or combination of clays in which the total of inorganic impurities does not exceed 0.8%, and in which the V$_2$O$_5$ is not over 0.005%. The amount of water added to secure suitable slip consistency should be, as stated above, between 40 and 48% of the weight of the frit, but may vary outside these limits in accordance with well-known enameling practice.

In order to secure suitable slip action during application and also to assist during the firing on of the enamel, it has been found desirable to add from 0.1 to 0.5% (e. g., 0.25%) of a soluble sulfate, such as sodium sulfate. When percentages of a soluble sulfate are indicated in this description and the accompanying claims, it is understood that these refer to percentages of anhydrous sulfate, although the material may be employed either in the hydrated or anhydrous forms. Other suitable sulfates are those of the other alkali metals such as lithium and potassium, and of ammonium.

In firing the enamels, a certain minimum viscosity is desirable. According to the flow test procedure described by Charles J. Kinzie (Journal of the American Ceramic Society, vol. 15 (1932), 357: "Method for the Study of the Relative Viscosity of Enamel Glasses"), the flow should preferably be 35 mm. or more at 1520° F. However, enamels having flow tests less than this may also be used, where other desirable characteristics of such enamels justify their use.

The invention having been described generally, the following specific examples are now given:

EXAMPLE 1

The following ingredients (parts by weight) were mixed together and smelted in customary fashion at a temperature of 2050°–2100° F.

| | |
|---|---|
| Dehydrated borax | 10.84 |
| Quartz | 37.57 |
| Soda ash | 12.25 |
| Sodium nitrate | 5.00 |
| Zircon | 17.24 |
| Bone ash | 2.78 |
| Zinc oxide | 1.50 |
| Sodium silicofluoride | 15.66 |
| Titanium oxide | 7.00 |

The frit thus formed was quenched in water in well-known fashion, and mixed with 3½ parts of Kentucky ball clay, 3½ parts of enameler's clay, ¼ part of anhydrous sodium sulfate, ⅛ part of bentonite, 40 parts of water and 10 parts of opacifier per 100 parts of frit to form a slip. The opacifier was a mechanical mixture of 40% titanium oxide, 35% zirconium oxide and 25% zinc zirconium silicate, milled to a fineness of minus 325 mesh. The slip was milled to a fineness of less than 1 gram residue on a 200 mesh sieve.

When sprayed onto panels and fired for 2½ minutes at 1520° F. this enamel showed a reflectance of 63.5, as measured by the Hunter reflectometer, at an application rate of 28.8 grams per sq. ft., a reflectance of 68.9 at an application rate of 39.6 grams per sq. ft., a reflectance of 71.7 at an application rate of 48.6 grams per sq. ft., and a reflectance of 74.0 at an application of 59.4 grams per sq. ft.

EXAMPLE 2

The following ingredients (parts by weight) were mixed together and smelted in customary fashion at a temperature of 2050°–2100° F.

| | |
|---|---|
| Dehydrated borax | 17.67 |
| Quartz | 36.80 |
| Soda ash | 5.30 |
| Sodium silicofluoride | 11.28 |
| Calcium fluoride | 5.64 |
| Titanium oxide | 4.70 |
| Amblygonite | 1.88 |
| Sodium nitrate | 5.00 |
| Calcium carbonate | 8.39 |
| Calcium zirconium silicate | 12.62 |

The frit thus formed was quenched in water, and mixed with 7 parts of enameler's clay, ¼ part of anhydrous sodium sulfate, ⅛ part of bentonite, 44 parts of water and 10 parts of the same opacifier as in Example 1, per 100 parts by weight of frit. This mixture was milled to a fineness of less than 1 gram residue on a 200 mesh sieve. When sprayed on a panel and fired for 2½ minutes at 1520° F., this enamel showed a reflectance of 76.7, as measured by the Hunter reflectometer, at an application rate of 72.0 grams per sq. ft.

EXAMPLE 3

The following ingredients (parts by weight) were mixed together and smelted in customary fashion at 2050°–2100° F.

| | |
|---|---|
| Dehydrated borax | 10.00 |
| Quartz | 34.65 |
| Soda ash | 11.08 |
| Sodium silicofluoride | 14.47 |
| Titanium oxide | 5.07 |
| Sodium nitrate | 5.00 |
| Zircon | 15.90 |
| Zinc oxide | 1.38 |
| Monazite sand | 11.07 |

The frit thus formed was milled with the mill mixture and the slip fired on a panel as in Example 2. The enamel showed a reflectance of 70.7 at an application rate of 40.2 grams per sq. ft.

EXAMPLE 4

The following ingredients (parts by weight) were mixed together and smelted in customary fashion at 2050°–2100° F.

| | |
|---|---|
| Dehydrated borax | 10.14 |
| Quartz | 33.02 |
| Soda ash | 13.90 |
| Sodium silicofluoride | 6.47 |
| Calcium fluoride | 10.28 |
| Titanium oxide | 6.54 |
| Amblygonite | 2.45 |
| Sodium nitrate | 5.00 |
| Zircon | 16.12 |
| Topaz | 5.00 |

The frit thus formed was milled with the mill mixture and the slip fired on a panel as in Example 2. The enamel showed a reflectance of 70.8 at an application rate of 40.2 grams per sq. ft.

EXAMPLE 5

The following ingredients (parts by weight) were mixed together and smelted in customary fashion at 2050°–2100° F.

| | |
|---|---|
| Dehydrated borax | 10.70 |
| Quartz | 37.13 |
| Soda ash | 12.06 |
| Sodium nitrate | 4.93 |
| Zircon | 17.00 |
| Zinc oxide | 1.48 |
| Titanium oxide | 6.90 |
| Sodium silicofluoride | 15.47 |
| Amblygonite | 2.59 |

The frit thus formed was milled with the mill mixture and the slip fired on a panel as in Example 2.

The following table shows the approximate percentages of the various elements in the frits of the above examples. All elements, except fluorine, are calculated as the oxides, although at least part of the metal constituents are combined with fluorine and not oxygen. Thus, the sum total of the ingredients will add up to over 100%, this being explained by the fact that fluorine and not oxygen is combined with part of the metal constituents.

Table

| | Example No. | | | | |
|---|---|---|---|---|---|
| | 1 | 2 | 3 | 4 | 5 |
| $Na_2O$ | 17 | 14 | 16 | 15 | 17 |
| $CaO$ | 1½ | 11 | | 7 | |
| $B_2O_3$ | 7 | 12 | 7 | 7 | 7½ |
| $ZnO$ | 1½ | | 1½ | | 1½ |
| $Li_2O$ | | 0.2 | | 0.2 | 0.2 |
| $Al_2O_3$ | | 0.7 | | 3 | 0.9 |
| $ZrO_2$ | 11 | 7 | 11 | 10 | 11 |
| $TiO_2$ | 7 | 5 | 5 | 7 | 7 |
| $SiO_2$ | 48 | 44 | 46 | 44 | 49 |
| $P_2O_5$ | 1 | 1 | 3½ | 1 | 1 |
| Rare earth oxides | | | 7 | | |
| Fluorine | 9 | 7 | 5 | 8 | 5 |

When parts or percentages are mentioned, parts by weight are understood.

As many variations are possible within the scope of this invention, it is not intended to be limited except as defined by the appended claims.

I claim:

1. A frit composition for forming vitreous enamels containing 32 to 58 per cent silica, 6 to 16 per cent zirconium oxide, 4 to 9 per cent titanium oxide, ½ to 3½ per cent phosphorus pentoxide, less than 3½ per cent alumina, 6 to 14 per cent boric anhydride, 13 to 20 per cent soda and 2½ to 11 per cent fluorine.

2. A frit composition for forming vitreous enamels containing 32 to 58 per cent silica, 6 to 16 per cent zirconium oxide, 4 to 9 per cent titanium oxide, an appreciable amount up to 5 per cent zinc oxide, ½ to 3½ per cent phosphorus pentoxide, less than 3½ per cent alumina, 6 to 14 per cent boric anhydride, 13 to 20 per cent soda and 2½ to 11 per cent fluorine.

3. Method of making a vitreous enamel, comprising forming a raw batch composition containing 32 to 58 per cent silica, 6 to 16 per cent zirconium oxide, 4 to 9 per cent titanium oxide, ½ to 3½ per cent phosphorus pentoxide, less than 3½ per cent alumina, 6 to 14 per cent boric anhydride, 13 to 20 per cent soda and 2½ to 11 per cent fluorine, smelting said composition to form a frit, milling said frit with water, clay and an opacifier composition in such quantities as to attain proper slip characteristics, said opacifier composition containing 20 to 60 per cent titanium oxide, 15 to 55 per cent zirconium oxide and 10 to 40 per cent double silicate of zirconium and a metal of group II of the periodic system forming a white or colorless oxide, applying the slip thus formed to a surface to be enameled, and firing to form an enamel.

4. Method of making a vitreous enamel, comprising forming a raw batch composition containing 32 to 58 per cent silica, 6 to 16 per cent zirconium oxide, 4 to 9 per cent titanium oxide, an appreciable amount up to 5 per cent zinc oxide, ½ to 3½ per cent phosphorus pentoxide, less than 3½ per cent alumina, 6 to 14 per cent boric anhydride, 13 to 20 per cent soda and 2½ to 11 per cent fluorine, smelting said composition to form a frit, milling said frit with water, clay and an opacifier composition in such quantities as to attain proper slip characteristics, said opacifier composition containing 20 to 60 per cent titanium oxide, 15 to 55 per cent zirconium oxide and 10 to 40 per cent zinc zirconium silicate applying the slip thus formed to a surface to be enameled, and firing to form an enamel.

5. Method of making a vitreous enamel, comprising forming a raw batch composition containing 32 to 58 per cent silica, 6 to 16 per cent zirconium oxide, 4 to 9 per cent titanium oxide, ½ to 3½ per cent phosphorus pentoxide, less than 3½ per cent alumina, 6 to 14 per cent boric anhydride, 13 to 20 per cent soda and 2½ to 11 per cent fluorine, smelting said composition to form a frit, milling said frit with water, clay, 0.1 to 0.5 per cent of a soluble sulfate taken from the group consisting of alkali metals and ammonium, and an opacifier composition in such quantities as to attain proper slip characteristics, said opacifier composition containing 20 to 60 per cent titanium oxide, 15 to 55 per cent zirconium oxide and 10 to 40 per cent double silicate of zirconium and a metal of group II of the periodic system forming a white or colorless oxide, applying the slip thus formed to a surface to be enameled, and firing to form an enamel.

6. Method of making a vitreous enamel, comprising forming a raw batch composition containing 32 to 58 per cent silica, 6 to 16 per cent zirconium oxide, 4 to 9 per cent titanium oxide, ½ to 3½ per cent phosphorus pentoxide, less than 3½ per cent alumina, 6 to 14 per cent boric anhydride, 13 to 20 per cent soda and 2½ to 11 per cent fluorine, smelting said composition to form a frit, milling said frit with water, clay, an opacifier and 0.1 to 0.5 per cent of a soluble sulfate taken from the group consisting of alkali metals and ammonium, in such quantities as to attain proper slip characteristics, applying the slip thus formed to a surface to be enameled, and firing to form an enamel.

7. Method of making a vitreous enamel, comprising forming a raw batch composition containing 32 to 58 per cent silica, 6 to 16 per cent zirconium oxide, 4 to 9 per cent titanium oxide, ½ to 3½ per cent phosphorus pentoxide, less than 3½ per cent alumina, 6 to 14 per cent boric anhydride, 13 to 20 per cent soda and 2½ to 11 per cent fluorine, smelting said composition to form a frit, milling said frit with water, clay, an opacifier and 0.1 to 0.5 per cent of sodium sulfate, in such quantities as to attain proper slip characteristics, applying the slip thus formed to a surface to be enameled, and firing to form an enamel.

LEON J. FROST.